Oct. 19, 1965   R. NEUSCHOTZ   3,212,796

SEALED THREADED FITTING

Filed July 16, 1962

ROBERT NEUSCHOTZ
INVENTOR.

BY William P. Green
ATTORNEY

United States Patent Office 3,212,796
Patented Oct. 19, 1965

3,212,796
SEALED THREADED FITTING
Robert Neuschotz, 1162 Angelo Drive,
Beverly Hills, Calif.
Filed July 16, 1962, Ser. No. 209,941
2 Claims. (Cl. 285—91)

This invention relates to an improved type of threaded fitting, to be connected into an opening in a carrier part, and to which a coacting threaded member may be attached to connect that member to the carrier part through the medium of the threaded fitting. Though it is to be understood that the invention in its broadest aspects is applicable to any of various different situations, certain specific features of the invention are especially useful in providing a structure to which a conventional threaded high pressure type fluid fitting is connectible in sealed fluid tight relation.

A major object of the invention is to provide an element of the discussed type to which a pressure fitting or other unit is connectible, and which is adapted to be effectively locked in its fully installed position within a carrier part, and to be effectively retained against removal from that part. For this purpose, I provide one or more locking keys, which may be driven into predetermined locking positions after the element has been screwed into the carrier part, and which in those positions engage the element and the carrier part in a manner preventing unscrewing movement of the element. Also, the device is desirably so designed as to provide an effective fluid tight seal between the threaded element and the engaged carrier part, so that fluid can not leak past the element and between it and the carrier part. To attain such a seal, the assembly may include a seal ring, with the threaded element being held against the seal ring and in fluid tight engagement therewith by the locking action of the above discussed locking keys.

Structurally, an element embodying the invention takes the form of a body having external threads engageable with internal threads within the opening in the carrier part, and also having an enlarged diameter flange at a location axially outwardly of the external threads and receivable within a counterbore formed in the carrier part. The seal ring is carried at the axially inner side of the flange, to form a seal between that flange and an opposed surface of the carrier part. The locking key or keys engage the flange, to form a lock between the flange and the counterbore. Preferably, the keys are mounted within slots extending axially along the outer surface of the flange, and are adapted to be driven axially, and to engage and bite into the material of the carrier part when thus driven. For connection to a coacting pressure fitting, the element desirably contains a passage extending into its axially outer end, and through the flange, and into the externally threaded portion of the element, with this passage having internal threads engageable with a pressure fitting. Also, the axially outer end of the element may be adapted for engagement with a seal ring, which is associated with the pressure fitting to form a seal therewith.

The above and other features and objects of the present invention will be better understood from the following detailed description of the typical embodiments illustrated in the accompanying drawing, in which.

Figure 1:
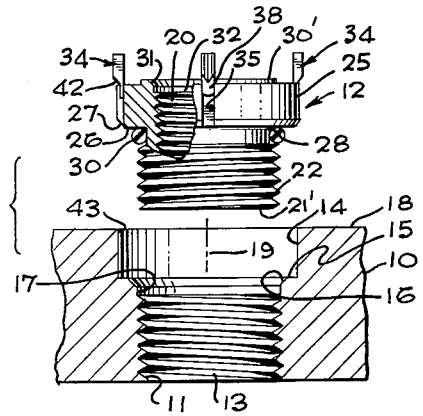
FIG. 1 is a partially sectional view representing a threaded element embodying the invention, and a carrier part into which the element is to be connected, with the parts being shown prior to the installation of the element into the carrier part.

Referring first to FIG. 1, there is represented at 10 a carrier part containing an opening 11 into which a threaded element 12 embodying the invention is to be connected. The opening 11 is typically represented as extending entirely through the carrier part, but it is to be understood that the opening may of course be a "blind" opening if desired, having its lower or axially inner end closed. After element 12 has been fully installed within opening 11 and carrier part 10, there may be connected into element 12 a conventional fluid tight pressure fitting 13' (see FIG. 4).

The wall of opening 11 forms screw threads 13 at the axially inner end of the opening, and outwardly of these threads that wall forms a cylindrical counterbore 14 of substantially greater diameter than the threads. Between the threads and counterbore, the carrier part forms a transverse annular shoulder 15, a tapering frusto-conical annular seal surface 16, and a short cylindrical surface 17. The counterbore 14 terminates at the location of a planar outer surface 18 of the carrier part, disposed parallel to the surface 15 and transversely of the main axis 19 about which the threads, counterbore, and surfaces 15, 16 and 17 are centered.

The threaded element 12 takes the form generallly of a tubular body, as seen clearly in FIG. 1, having internal threads 20 adapted to interengage with external threads 21 on fitting 13. These threads 20, like the other threads in the disclosure, are preferably of uniform diameter along their axial extent. Also, the threads 20 desirably continue axially inwardly to the innermost end 21' of element 12. Externally, element 12 has a set of threads 22 dimensioned to engage threads 13 in the carrier part. In the fully installed condition of element 12 (FIG. 2), the threads 13 and 22 desirably terminate axially outwardly in essentially a common plane designated by the number 23 in FIG. 2.

Figure 2:
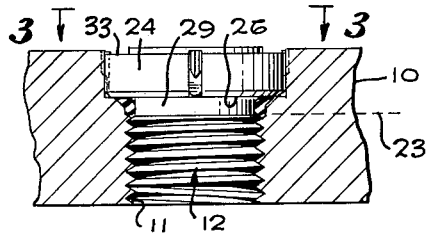
FIG. 2 shows the element in its fully installed position.
Figure 3:
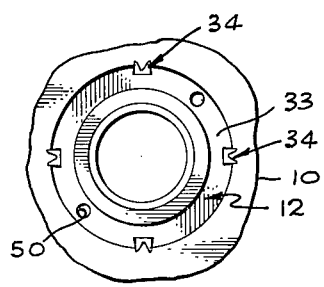
FIG. 3 is a view taken on line 3—3 of FIG. 2.

At its axially outer end, element 12 has an enlarged diameter flange portion 24, whose outer surface 25 may be cylindrical and of a diameter corresponding approximately to that of counterbore 14, but of course loose enough within the counterbore to allow installation of element 12 to the FIG. 2 position. As will be apparent from the drawing, the diameter of the outer surface 25 of the flange is considerably greater than the major diameter of threads 22. At the axially inner side of flange 24, the element 12 forms an annular surface or shoulder 26, disposed transversely of main axis 19 of the device, with a short bevel or tapering surface 27 being provided at the periphery of surface 26. At the radially inner edge of annular surface 26, this surface may merge with a smoothly curving annular corner surface 28, which in turn merges with a short cylindrical surface 29 vertically between the threads 22 and flange 24. An annular seal ring 30 (see FIG. 1), typically a conventional rubber or neoprene O-ring, is received about element 12 at the location of surface 29, and in engagement with surfaces 29 and 26.

The axially outer side of flange 24 has an annular transverse seal surface 30', adjacent which there may be provided a short tapering surface 31 and a short cylindrical surface 32, axially outwardly of internal threads 20. About seal surface 30', there is provided as an annular transverse surface 33, the plane of which is off-set a short distance axially inwardly from the transverse plane of surface 30.

For securing the element 12 in its fully installed FIG. 2 position, flange 24 carries one or more (preferably 4) locking keys 34. These keys may be spaced uniformly about the periphery of element 12, and may be contained within individual grooves 35 extending axially along the outer surface 25 of the flange. As seen best in FIG. 5, each groove 35 is of dove-tail cross-section transversely of axis 19, being defined by an inner wall 36 facing radially outwardly and two side walls 37 which converge as they advance radially outwardly.

Figure 5:
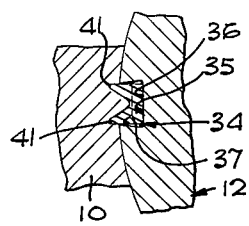
FIG. 5 is a further enlarged fragmentary transverse section taken on line 6—6 of FIG. 5.

The individual keys 34 may be formed of a metal hard enough to cut into or deform the metal or other material from which part 10 is formed, when the keys are driven axially to lock element 12 in its ultimate fully installed position. Each key has an axially inner portion 38 which is received adjacent inner wall 36 of the associated groove 35, and is thin enough radially to be received entirely within the groove, and not project outwardly therebeyond. This portion 38 of the key is received within the coacting groove 35 prior to installation of element 12 into the carrier part, and is wide enough to be a rather tight frictional fit within the groove, to very effectively and securely retain each of the keys by friction in the initial positions of FIG. 1. Axially outwardly of their portions 38, each of the keys 34 has a portion 39 which is of increased radial thickness, great enough to project radially beyond the confines of groove 35, as seen in FIG. 5, but may be slightly narrower than portion 38. This portion 39 may be divided by an axial groove 40 into two axially extending cutting edges 41, with these edges being tapered at their lower ends both as viewed in FIG. 5 and as viewed when looking radially inwardly toward the key (see the center key in FIG. 2), so that the lower ends of the knife edges 41 are tapered and sharp and capable of cutting effectively into the material of part 10. In the initial FIG. 1 positions of the keys, in which they are retained by friction, the lower tapered ends 42 of the two knife edges of each key terminate at approximately the plane of transverse surface 33, so that the tapered edges 42 are engageable with the upper corner 43 of the carrier part in a manner limiting the extent to which element 12 is screwed into the carrier part. The keys 34 may typically be formed of a relatively hard steel.

To now describe the full process of installing element 12 within carrier part 10, assume that the element 12 is initially in the condition illustrated in FIG. 1, with keys 34 tightly frictionally held in their FIG. 1 positions, and with ring 30 received about the element. In this condition, part 12 is inserted into opening 11, until threads 22 engage threads 13, and is then turned, typically by a spanner wrench engaging two spanner wrench holes 50 in surface 33, to screw element 12 fully into opening 11 and to the position of FIGS. 2 and 4. When element 12 reaches this condition, the installing rotation is limited by engagement of the lower tapered surfaces 42 of keys 34 with the upper corner 43 of carrier part 10. In that position, surface 33 of element 12 is received slightly axially inwardly of outer surface 18 of part 10, while surface 30 is received slightly axially outwardly of surface 18. The installing rotation may also be limited by engagement of the inner shoulder surface 26 with the transverse surface 15 in the carrier part.

Figure 4:
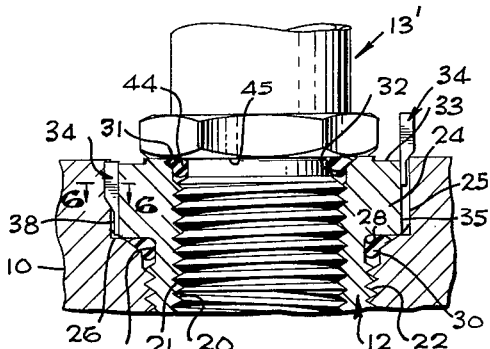
FIG. 4 is an enlarged fragmentary axial section illustrating the element in its fully inserted position, after one of the illustrated locking keys has been driven, but prior to driving of the other keys.

By the time element 12 reaches the FIG. 4 position, seal ring 30 has been substantially deformed and clamped between flanges 24 and the carrier part, and annularly engages all of the surfaces 16, 17, 26, 28 and 29 in a manner forming a very positive and tight fluid seal between element 12 and the carrier part. With the seal ring thus deformed, and element 12 in this installed position, the keys 34 are driven axially, by a hammer or other driving tool, from the position of the right hand key in FIG. 4 to that of the left hand key, so that the radially projecting edge portions 41 of the keys cut into the inner wall of counterbore 14, and thereby securely lock element 12 against unscrewing rotary motion relative to the carrier part. The keys are of course frictionally retained in this driven position, so that the entire assembly is effectively secured in part 10. The mating pressure fitting 13' may then be screwed into internal threads 20, with the seal ring 44 of the pressure fitting annuarly engaging the pressure fitting surface and surfaces 31 and 32 of element 12, to form an annular fluid tight seal therewith. The transverse shoulder surface 45 on fitting 13 engages axially facing outer surface 30' of element 12, to limit the extent to which the fitting is screwed into element 12.

Figure 6:
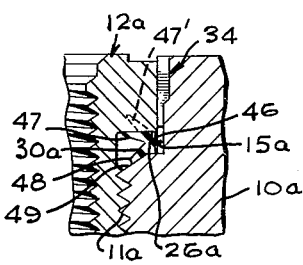
FIG. 6 is an enlarged fragmentary axial section through an arrangement utilizing a different type of seal ring.
Figure 7:
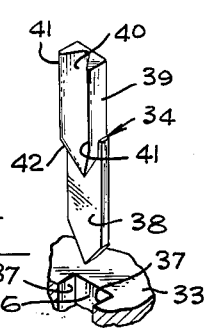
FIG. 7 is a perspective view of one of the keys.

FIG. 6 represents a slightly variational type of carrier part 10a, containing an opening 11a which is adapted for use of a known type of metal seal 30a instead of the O-ring 30 of FIG. 1. The seal ring 30a has a radially outer portion 46 which is clamped between transverse shoulder surface 26a of element 12a and transverse surface 15a of part 10a. This portion 46 carries two inwardly projecting flaring annular portions 47 and 48, engaged by surface 26a of element 12a and a conical surface 49 of the carrier part respectively. Portion 47 may initially have the angularly upwardly projecting configuration represented in broken lines at 47' in FIG. 6, and be deformed to the full line position upon installation of element 12, to form the desired fluid seal between the parts.

I claim:

1. The combination comprising a connector element adapted to be connected into a carrier part containing an opening having a first internally threaded portion, and an enlarged counterbore axially outwardly thereof with a shoulder therebetween; said shoulder joining the wall forming said bore and being defined by a radially extending portion and an inclined surface, and said radial portion forming thereby one of a pair of coacting sealing surfaces, said element having a portion threaded externally about an axis and adapted to be screwed into said first portion of the opening, said element having a flange larger than said externally threaded portion and projecting radially outwardly therebeyond and substantially coextensive with said counterbore and adapted to be received in said counterbore, means on said flange defining an edge radially inwardly disposed from the periphery of said element and being circularly continuous about said axis and forming the second one of said pair of coacting sealing surfaces, said flange having an outer surface containing at least one locking recess, which recess is radially outwardly beyond said circularly continuous seal surface of the flange, a deformable seal ring disposed about said element at the axially inner side of said flange to be confined between said flange and shoulder and form a fluid tight seal therebetween, and at least one locking key received within said locking recess in the outer surface of said flange and projecting axially outwardly from said recess and adapted to be driven axially after said element is screwed into said carrier part, said key having a portion projecting radially outwardly far enough to engage and bite into the material of said carrier part within said counterbore, when the key is driven axially, to thereby lock said element against unscrewing movement and retain said flange tightly against said seal ring, said seal ring having a portion which is essentially axially opposite said sealing surface of the flange and is engageable therewith in sealing relation circularly continuously about said axis, and said coacting sealing surfaces being in metal to metal contact at a location radially inwardly of said recess and said key, said element having a second set of threads in addition to those of said externally threaded portion for connection to a fluid passing unit.

2. The combination as recited in claim 1, in which said locking recess is an axial groove continuing along essentially the entire axial extent of said flange and having an inner end opening axially inwardly at a location adjacent and radially outwardly of said seal surface of the flange.

References Cited by the Examiner

UNITED STATES PATENTS

| | | | |
|---|---|---|---|
| 213,667 | 3/79 | Kronenberg | 285—201 X |
| 861,139 | 7/07 | Newman | 151—8 |
| 2,203,219 | 6/40 | Jackman | 151—57 |
| 2,400,318 | 5/46 | Rosan | 285—91 |
| 2,452,262 | 10/48 | Rosan | 151—41.73 X |
| 2,481,404 | 9/49 | Donner | 285—190 |
| 2,855,970 | 10/58 | Neuschotz | 151—41.73 |
| 2,893,756 | 7/59 | Sundstrom | 285—158 X |
| 3,130,765 | 4/64 | Neuschotz | 151—23 X |

CARL W. TOMLIN, *Primary Examiner.*